United States Patent [19]

Lindskog et al.

[11] Patent Number: 4,802,858
[45] Date of Patent: Feb. 7, 1989

[54] DEVICE FOR TEACHING TREATMENT OF SKELETON INJURIES

[75] Inventors: Kjell Lindskog, Skellefteå; Jan Sandegård, Östersund, both of Sweden

[73] Assignee: Procare AB, Skelleftea, Sweden

[21] Appl. No.: 928,282

[22] PCT Filed: Feb. 7, 1986

[86] PCT No.: PCT/SE86/00052
§ 371 Date: Oct. 14, 1986
§ 102(e) Date: Oct. 14, 1986

[87] PCT Pub. No.: WO86/04711
PCT Pub. Date: Aug. 14, 1986

[30] Foreign Application Priority Data

Feb. 11, 1985 [SE] Sweden .................................. 8500604

[51] Int. Cl.$^4$ ............................................. G09B 23/32
[52] U.S. Cl. ............................................................. 434/274
[58] Field of Search ............... 434/274, 267, 366, 265; 273/159; 446/380

[56] References Cited

U.S. PATENT DOCUMENTS

| | | | |
|---|---|---|---|
| 906,566 | 12/1908 | Scherf | 446/380 |
| 1,322,733 | 11/1919 | Cone | 446/380 |
| 1,348,216 | 8/1920 | Giebeler-Wanke | 446/380 |
| 2,781,611 | 2/1957 | Bills et al. | 434/267 |
| 3,895,451 | 7/1975 | Smrcka | 434/274 |
| 4,350,490 | 9/1982 | Sandegård | 434/274 |
| 4,488,433 | 12/1984 | Denton et al. | 434/274 |
| 4,605,373 | 8/1986 | Rosen | 434/274 |

Primary Examiner—David A. Scherbel
Assistant Examiner—Caroline D. Dennison
Attorney, Agent, or Firm—Cushman, Darby & Cushman

[57] ABSTRACT

Apparatus for teaching treatment of a skeletal injury including an artificial body part having two spaced-apart portions made of shape permanent material and a portion of non-rigid deformable material disposed in the space between said shape permanent portions; a hollow, elongated bone-simulating member in each shape permanent portion, the members projecting from their respective shape permanent portions into the deformable portion so as to face each other and form therein a place of simulated skeletal injury; connected to the projecting ends of the members for applying thereto a force which resiliently resists separation of the projecting ends of the members in the longitudinal direction; a locking pin longitudinally movable within the members between a position wholly within one member and a position partially within both members for releasably locking the members against angular displacement relative to each other; and a manually operable device connected to the locking pin for applying a longitudinal moving force thereto.

8 Claims, 3 Drawing Sheets

DEVICE FOR TEACHING TREATMENT OF SKELETON INJURIES

This invention relates to a device for teaching treatment of a skeleton injury, said device comprising one or more artificial parts of the body which are provided with one or more places of injury.

BACKGROUND OF THE INVENTION

A device of the kind mentioned above is previously known from Swedish Pat. No. 7908218-6 (U.S. Pat. No. 4,350,490). However, this known device has a plurality of disadvantages. Thus, the place of injury of the known device cannot be locked, i.e. the artifical part of the body cannot be made stiff in the region of the place of injury. As the device of the present invention preferably consists of an artificial part of the body with at least two places of injury, it is advantageous that the place of injury not being used can be locked, i.e. the part of the body can be made stiff in the region of said place of injury.

Another disadvantage of the known device is that the means simulating muscles in the region of the place of injury are not adjustable in respect of the function of the muscles when the parts of the body on both sides of the place of injury are reciprocally skewed.

The known device has also a drawback in that it lacks the ability, in a simulated fractured leg, to permit turning of the parts located on both sides of the place of injury relative to each other in the longitudinal direction of the part of the body.

It is the object of this invention to present a device which can simulate in a way as lifelike as possible a skeleton fracture of a part of the body as far as the movability of the parts located on both sides of the place of injury relative to each other is concerned. Moreover, it must be possible to lock the places of injury not used in connection with the current teaching, i.e. it must be possible to make the part of the body stiff in the region of the place of injury.

BRIEF DESCRIPTION OF THE DRAWINGS

An illustrative example of a device according to the invention will be described below with reference to the enclosed drawings, in which.

Figure 1:
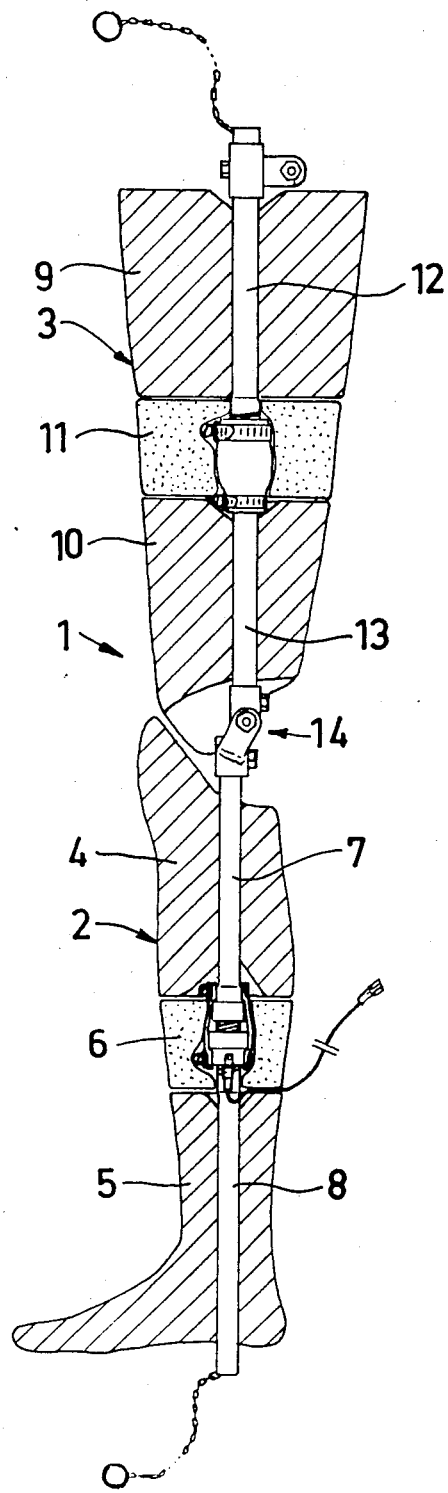
FIG. 1 shows a leg dummy with two artificial places of injury.

The leg dummy 1 shown in FIG. 1 consists of two main parts, viz a lower leg part 2 and a thigh-bone part 3.

DETAILED DESCRIPTION

The lower leg part 2 has an upper portion 4 and a lower portion 5 which are made of foamed shape permanent plastic. Between said portions 4, 5 there is arranged a portion 6 of a non-rigid foamed plastic. In each of the portions 4 and 5 a bone-simulating member such as a pipe 7 and 8, respectively, are cast which connect to each other within the portion 6 of non-rigid foamed plastic, said connection being the artificial place of fracture which will be described below more in detail with reference to FIGS. 2 and 3.

In a manner corresponding to the lower leg part 2 the thigh-bone part has an upper portion 9 and a lower portion 10 which are also made of a foamed shape permanent plastic. A connecting portion 11 of non-rigid foamed plastic is disposed between these portions. In each of the upper and lower portions 9 and 10 pipes 12 and 13, respectively, are cast which connect to each other within the connecting portion 11, said connection being made in a manner corresponding to that which will be described more in detail with reference to FIGS. 2 and 3.

As is apparent from FIG. 1 the pipes 7 and 13 are stretched to each other by a joint 14 which, thus, forms the knee-joint of the leg dummy 1 according to the invention.

Figure 2:
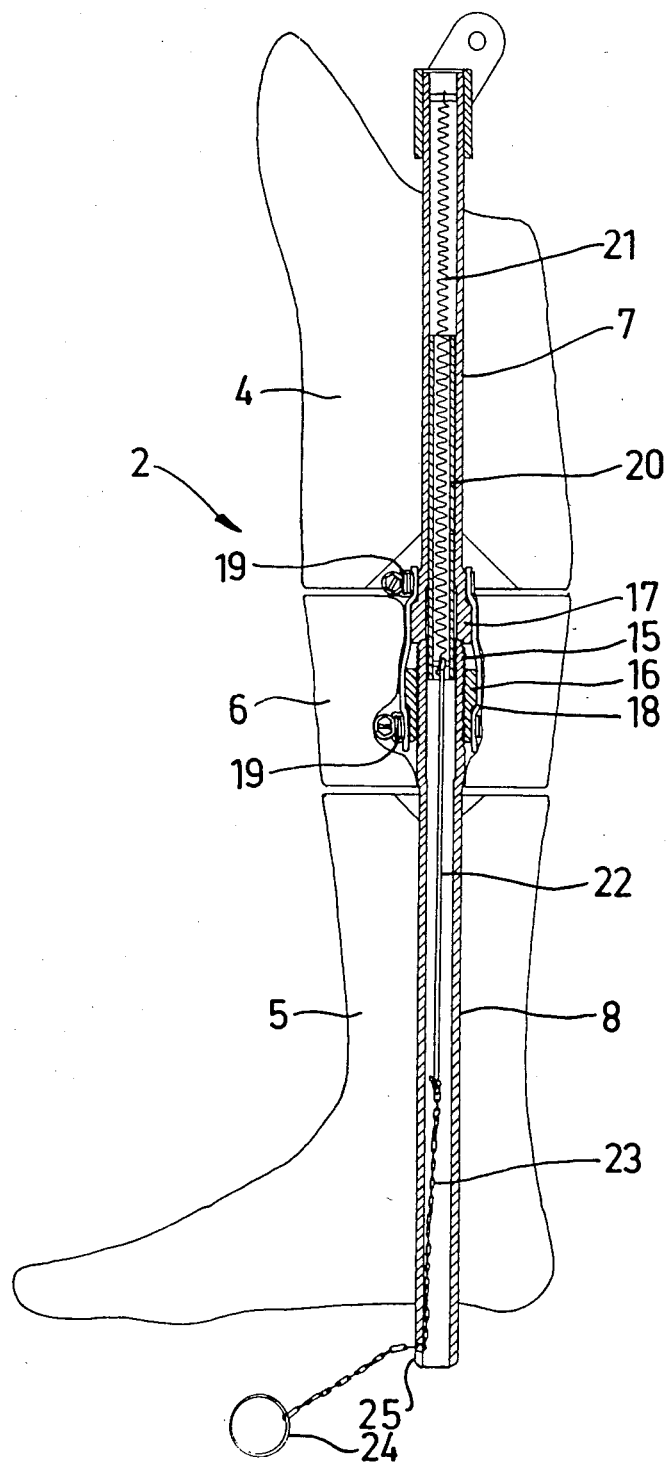
FIG. 2 shows a detail of a place of injury in a stiff state.

The build-up of the artificial place of fracture is apparent more in detail from the lower leg part 2 shown in FIG. 2. As is evident from FIG. 2 the pipe 8 is provided with an external thread 15 at its upper end which, thus, is located within the connecting portion 6, an internally threaded sleeve 16 being arranged on said thread 15. The pipe 7 which, thus, is cast in the upper portion 4 has at its lower end a fixed collar 17 which has a larger inside diameter than the pipe 8. It is suitable that the upper end of the pipe 8 and the free end of the collar 17 are provided with bevels adapted to each other so that a good guiding cooperation is obtained between these portions.

A gaiter 18 of elastic material, for example rubber, is arranged on the outside of the sleeve 16 and the collar 17, the end portions of the gaiter 18 being clamped to the sleeve 16 and collar 17, respectively, by means of hose clips 19. It is immediately appreciated that if the pipe 8 is rotated and then also the lower portion 5 cast with the pipe the sleeve 16 will be moved upwards or downwards along the outer thread 15, rotation of the sleeve 16 being prevented by the rubber gaiter 18. Thus, it is possible to adjust the length of the rubber gaiter 18, i.e. it is more or less stretched in its longitudinal direction. The purpose of this adjusting possibility will be explained later.

As is apparent from FIG. 2 a locking pin 20 movable in its longitudinal direction is also arranged within the pipes 7 and 8. The locking pin 20 has preferably a non-circular outer cross-section, the pipes 7, 8 also having a non-circular inner cross-section which corresponds to the outer cross-section of the locking pin 20.

The locking pin 20 is connected with a helical spring 21 exerting a tensile force and extending within the pin 20 where one of its ends is fastened while its other end is attached in the region of the upper end of the pipe 7. In the region of the lower end of the pin 20 a string 22 or the like is connected which, in turn, is lengthened by a chain 23 extending out of the lower end of the pipe 8 and ending with a holding ring 24. At its lower end the pipe 8 is provided with a notch 25 in which a link of the chain 23 can be inserted to lock the chain.

In the position shown in FIG. 2 the pin 20 has been pulled downwards against the action of the spring 21 so that the pin 20 extends past the joint between the pipes 7 and 8, i.e. the contact position between the upper end of the pipe 8 and the collar 17. The pin 20 is fixed in this position as the chain 23 has been locked in the notch 25. Thus, as the pin 20 extends past the joint between the pipes 7 and 8 the lower leg part is stiff in this position, i.e. it cannot be bent in the region of the artificial place of fracture. In this position of the pin 20 the lower part 5 is also locked against rotation relative to the upper part 4 around the longitudinal axis of the leg dummy due to the non-circular cross-sections of the pin 20 and the pipes 7, 8.

A simulated fracture on the lower leg part 2 of the leg dummy 1 according to the invention will now be described with reference to FIG. 3.

Figure 3:
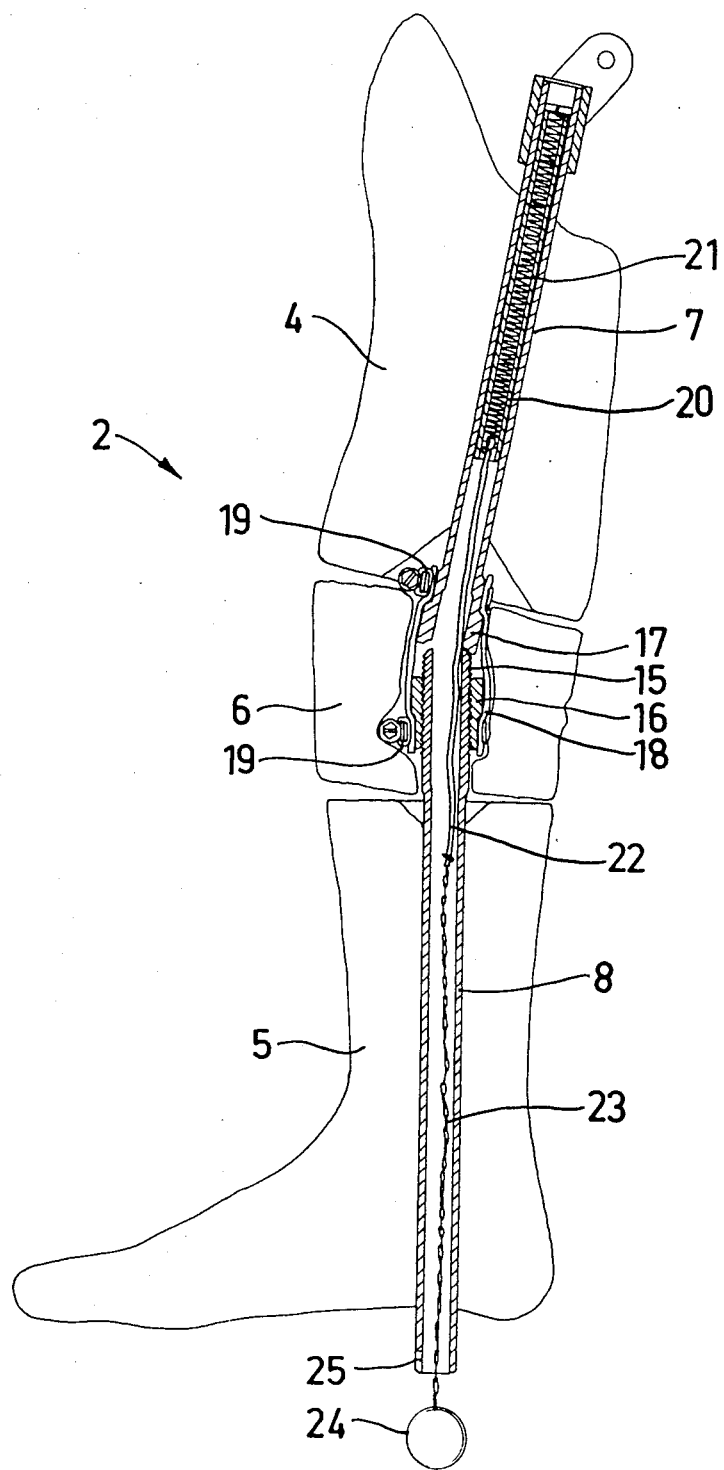
FIG. 3 shows a detail of a place on injury where a fracture of the artificial part of the body has been simulated.

In order to provide a simulated fracture in the lower leg part 2 the chain 23 is loosened from its locking in the notch 25, the locking pin 20 being pulled upwards into an inactive position by the action the spring 21, see FIG. 3. Thus, the pin 20 is located within the top of the pipe 7 and does not extend past the joint between the pipes 7 and 8. In this position of the locking pin 20 the pipe 8 with its associated lower portion 5 can be placed at an angle to pipe 20 with its associated portion 4 which is illustrated in FIG. 3.

When the lower portion 5 of the lower leg part 2 is placed at an angle to the upper portion 4 a certain deformation of the connecting portion 6 will occur which, however, is easily done as this portion 6 is made of a non-rigid deformable foamed plastic.

Thus, it is the object of the rubber gaiter 18 extending across the joint between the pipes 7 and 8 to keep together the upper portion 4 and the lower portion 5, the gaiter 18 having an elasticity by which the natural muscles of the leg are imitated thus keeping together the portions of the leg in its longitudinal direction in case of a fracture. The rubber gaiter 18 can be stretched by rotating the lower portion 5 with associated pipe 8 relative to the upper portion 4 with associated portion 7. In this way the gaiter 18 can be given a suitable extension so that it imitates the natural muscles of the leg as lifelike as possible. It should also be pointed out in this connection that the pipe 8 and consequently also the associated lower portion 5 can be turned out laterally, i.e. the pipe can rotate in the sleeve 16, after the locking pin has been transferred to an inactive position. This agrees as well with how a natural fracture appears as the muscles do not exert any retaining force worth mentioning against turning of the broken part around the longitudinal axis of the leg.

According to a preferred embodiment of the invention the leg dummy 1 of the invention can be provided with a signal device (not shown) which can be connected where a fracture is to be simulated and operates in such a way that a summer tone or the like is heard when the pipes 7 and 8 are in contact with each other, these portions corresponding to the broken leg ends at a real fracture. Thus, the summer signal indicates that the patient cries due to the pain arising when the broken leg ends get in contact with each other. In order to correct this condition the lower leg portin 2 must thus be stretched so that the lower portion 5 is somewhat withdrawn from the upper portion 4, the lower leg part 2 being put into splints in this position. Such a method corresponds extraordinarily well to the measure taken at a natural fracture, i.e. the leg is stretched and then put into splints in a stretched position.

To ensure that the summer signal thus indicating pain of the person being treated will actually stop when the lower portion 5 of the leg dummy is stretched, the string 22 must be made of an electrically non-conductive material.

If the rubber gaiter 18 after being used for some time does not show enough pre-stress, i.e. it does not simulate satisfactorily the natural muscles of a leg the rubber gaiter can be further pre-stressed, as described above, by rotating the pipe 8 in a suitable direction will move the sleeve 16 to downwards to cause stretching of the rubber gaiter.

By the constructive design given to the leg dummy according to the invention a fracture can be simulated by the aid thereof in a way extraordinarily true to life which is of a great importance in order that those persons being trained by the aid of the leg dummy 1 according to the invention might recognize the situation when confronted with a real case.

Thus, the illustrative example described above refers to a leg dummy which can simulate a fracture on a lower leg or a femur. However, the invention is not restricted to legs or the number of fracture places that can be simulated. It is also fully possible within the scope of the invention to manufacture for example an arm dummy or even a complete human body dummy by means of which besides leg and arm fractures for instance neck fractures can be simulated. Thus, the invention is by no means restricted to the illustrative example described above but can be freely varied within the scope of the following claims.

We claim:

1. A device for teaching treatment of a skeletal injury comprising: an artifical body part having two spaced-apart portions made of shape-permanent material; an elongated bone-simulating member in the form of a pipe in each portion of the body part, said members projecting from their respective portions of shape permanent material and having end portions located outside their respective body portions of shape permanent material and in the space between said body portions and facing each other so as to form a place of simulated skeletal injury; means for applying a counter force to said bone-simulating members when they are separated from each other in the longitudinal direction of said members; and means operable from outside the body part for releasably locking said members against being moved angularly relative to each other, said locking means including a locking pin movable between a position wholly within one pipe and a position partially within both pipes, said device further including means for applying a resilient force to said pin in the longitudinal direction of the pipes.

2. A device as in claim 1 wherein said means for applying a counter force to said bone-simulating members includes a gaiter of elastic material connected to the end portions of said bone-simulating members.

3. A device as in claim 2 wherein the end portion of one said bone-simulating members is externally threaded, the device further including an internally threaded sleeve surrounding and threadedly cooperating with said external thread; said gaiter being connected to the outside of said sleeve.

4. A device as in claim 1 wherein the elongated, bone-simulating members are pipes, the ends of the pipes which face each other being beveled for good reciprocal guiding and the transverse dimension of one pipe being greater than that of the other pipe.

5. A device as in claim 1 wherein said means for applying a resilient force is a spring.

6. A device as in claim 1 wherein the inner cross-sections of the pipes are non-circular and equal and wherein the outer cross-section of the locking pin is complementary to the inner cross-sections of the pipes.

7. A device as in claim 1 including an elongated flexible member having an end connected to the locking pin in a manner such that a pull on the flexible member moves said locking pin against said resilient force, said flexible member extending through one of said pipes to a location outside said one pipe.

8. A device for teaching treatment of a skeletal injury comprising: an artificial body part having two spaced-apart portions made of shape permanent material and a portion of non-rigid deformable material disposed in the space between said shape permanent portions; a hollow, elongated bone-simulating member in each shape permanent portion, said members projecting from their respective shape permanent portions and having end portions located outside their respective shape permanent portions and in the space between said shape permanent portions so as to face each other and form in said space a place of simulated skeletal injury; means connected to said projecting ends of the members for applying thereto a force which resiliently resists separation of said projecting ends of said members in the longitudinal direction of said members; a locking pin longitudinally movable within said members between a position wholly within one member and a position partially within both members for releasably locking said members against angular displacement relative to each other; and a manually operable means connected to said locking pin for applying a longitudinal moving force to said locking pin.

* * * * *